United States Patent [19]
Zalonis

[11] 3,872,617
[45] Mar. 25, 1975

[54] TROLLING SINKER

[76] Inventor: Victor J. Zalonis, 9 Holiday Ave., Hatfield, Pa. 19440

[22] Filed: May 31, 1973

[21] Appl. No.: 365,703

[52] U.S. Cl. ............................................. 43/43.13
[51] Int. Cl............................................. A01k 95/00
[58] Field of Search............. 43/43.13, 42.22, 44.97

[56] References Cited
UNITED STATES PATENTS

| | | | |
|---|---|---|---|
| 2,115,302 | 4/1938 | Chochard | 43/43.13 |
| 2,201,082 | 5/1940 | Dobbins et al. | 43/43.13 |
| 2,749,651 | 6/1956 | Snider | 43/43.13 |
| 2,798,331 | 7/1957 | Westdahl | 43/43.13 |
| 2,803,081 | 8/1957 | Nicholson | 43/43.13 |
| 3,023,537 | 3/1962 | Madson | 43/43.13 |
| 3,032,912 | 5/1962 | Bengtsson | 43/43.13 |
| 3,401,483 | 9/1968 | Bellah et al. | 43/43.13 X |

FOREIGN PATENTS OR APPLICATIONS

| | | | |
|---|---|---|---|
| 1,179,351 | 1/1970 | United Kingdom | 43/43.13 |

*Primary Examiner*—Louis G. Mancene
*Assistant Examiner*—Daniel J. Leach

*Attorney, Agent, or Firm*—Dorfman, Herrell and Skillman

[57] ABSTRACT

A trolling sinker of generally teardrop form with an upper surface designed for planing. The form provides an enlarged head portion with a tapered tail having a center of gravity within the head portion. The sinker is generally streamlined and is provided with lugs extending from the upper and lower surfaces for connecting the sinker respectively to the line and the lure. The lugs are positioned rearwardly of the center of gravity and the line lug is provided with a series of connection points at different positions rearwardly from the center of gravity. Selection of the desired connection point determines the normal pitch attitude of the sinker when at rest and positions the upper planing surface at a rearwardly inclined angle which causes the sinker to seek a given depth as it is pulled through the water by the line. The selection of the connection point determines the depth which is sought by the sinker in normal operation and enables the fisherman to preselect the depth at which the lure is drawn through the water during the trolling or during retrieval after a cast.

5 Claims, 8 Drawing Figures

PATENTED MAR 25 1975 3,872,617
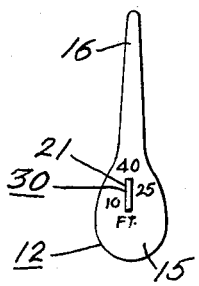
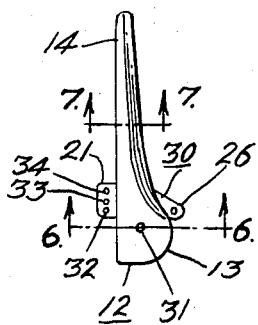
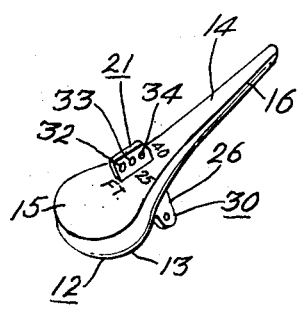
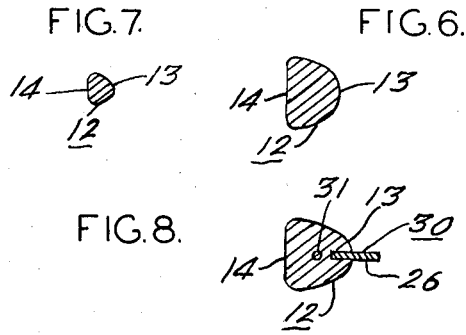
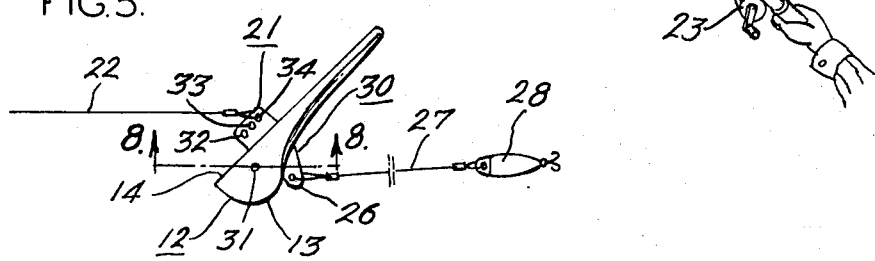

TROLLING SINKER

The present invention relates to fishing tackle and has particular application to an improved weight which controls the depth at which a lure is drawn through the water.

When fishing in large bodies of water, it has been found that the fish tend to congregate at a particular depth in the body, depending upon various factors such as the turbulence in the body of water, atmospheric conditions, etc. Accordingly, the chances for catching the fish are improved if the lure may be pulled through the water at the depth where the fish are located.

It is common procedure for fishermen to employ a depth finder in order to ascertain the preferred depth for the bait, and various sinkers are available which are designed to assist the fisherman in dropping his lure to the desired depth. In order to achieve the desired depth, the weight of the conventional sinker must be substantial and may add substantial weight to the fishing line which detracts from the enjoyment of fishing.

Furthermore, when using conventional sinkers when the lure is drawn through the water with the sinker attached, the pull on the line tends to elevate the sinker and the faster the pull, the greater the elevation, thereby reducing the depth at which the lure is drawn through the water. Since most sport fish will not strike at a lure that moves slowly, it is desirable to provide equipment which will permit a fast movement of the lure through the water without sacrificing the depth control.

With the foregoing in mind, the present invention provides an improved sinker which is designed to permit the fisherman to preselect the depth at which the sinker causes the lure to travel through the water.

The invention also provides a sinker which facilitates casting of the lure so that the lure may be cast easily. The lure may be cast beyond the situs where it is anticipated that the fishing will be effective and, upon retrieval of the lure, the drawing of the sinker through the water causes the lure to seek the proper depth.

The present invention provides a sinker which is highly economical to manufacture and which is fully effective in operation and use to accomplish the results desired.

All of the objects of the invention are more fully set forth hereinafter with reference to the accompanying drawings, wherein:

FIG. 1 is a plan view of the depth-finding sinker made in accordance with the present invention;

FIG. 2 is a side elevation of the sinker shown in FIG. 1;

FIG. 3 is a perspective view of the sinker;

FIG. 4 is a diagrammatic view illustrating the relationship of the sinker with the rod, reel, line and lure during a casting operation;

FIG. 5 is a view in side elevation illustrating the attitude which the sinker assumes during the retrieval operation when the lure is being drawn through the water;

FIG. 6 is a sectional view taken on the line 6—6 of FIG. 2;

FIG. 7 is a sectional view taken on the line 7—7 of FIG. 2; and

FIG. 8 is a sectional view taken on the line 8—8 of FIG. 5.

Referring now to the drawing, and particularly FIG. 4, the illustrated sinker comprises a body 12 having a rounded bottom surface 13 and a flat upper planing surface 14. As shown in FIG. 1, in plan the body is generally tear-shaped having a bulbous front portion 15 and a tapering tail portion 16. Whereas the bottom 13 of the bulbous head portion 15 is generally spherical as shown in FIGS. 6 and 8, the undersurface of the tail portion is somewhat triangular as shown in FIG. 7 so as to provide a keel effect as the sinker is drawn through the water. The outline of the sinker is generally streamlined as shown to permit the sinker to be drawn freely through the water.

The sinker is provided with a lug 21 upstanding from the upper surface 14 which is adapted to be attached to the line 22 which leads to the reel 23 and rod 24. On the undersurface, the sinker is provided with a lower lug 26 which is adapted to be attached to the leader 27 of the lure 28. In fabrication, the lugs 21 and 26 are preferably the upper and lower parts respectively of an insert element 30 of flat-plate form which is imbedded into the sinker body 12 during its formation as shown in FIG. 8. The element 30 is mounted in the body 12 coincident with the longitudinal center plane and so that its leading edge is positioned just rearwardly of the center of gravity of the body which is indicated at 31.

The upper lug 21 is provided with means for fastening to the line at a plurality of points at different distances rearwardly from the center of gravity 31. In the present instance, the fastening means comprise a series of holes 32, 33 and 34 which are punched out of the piece 30 as shown. As shown in FIG. 1, each hole has an indicia associated therewith, in the present instance the indicia "10," "25" and "40 feet" respectively. It has been found that when the line is attached to the sinker in the hole 32, the sinker assumes a pitch so that when the sinker is drawn through the water, the upper planing surface 14 generates a force tending to cause the sinker to seek a depth of approximately ten feet. Likewise, when the line is attached in the hole 33, the sinker seeks a depth of approximately 25 feet, and when the line is attached in the hole 34 as shown in FIG. 5, the sinker assumes a pitch as shown therein which causes it to seek a depth of 40 feet. The pitch of the sinker when combined with its weight and the speed of its travel through the water determine the depth at which the lure travels. The illustrated weight has a weight of approximately three ounces and operates at the indicated depth when it is manually retrieved by reeling in the line by the reel 23. If there is a current, or if the speed of travel through the water is increased, the depth increases and it may therefore be desirable to adjust the fastening point to obtain the desired depth of travel.

The teardrop shape of the sinker with the position of the lugs just rearwardly of the center of gravity provides for free traveling of the sinker freely through the water with minimum turbulence so that the fish are not distracted from attacking the lure and being caught in the hooks thereof. The effect provided by the keel-like tail stabilizes the sinker and assists in maintaining smooth flow of the sinker through the water. The streamlined shape not only facilitates travel of the sinker through the water, but also avoids the entrainment of plant life or other foreign bodies on the sinker, and snagging of the sinker on the bottom or the like.

The sinker is of relatively light weight, in the present instance approximately three ounces, so that the lure may be cast and retrieved without unduly stressing the line and without substantially increasing the weight which the fisherman must handle. Thus, when fishing for game fish, the sinker of the present invention does not detract from the "feel" of the rod, and the fish on the line.

Since the weight and the form of the sinker facilitates casting thereof, the sinker of the present invention enables the fisherman to cast the lure beyond a school of fish and to retrieve the lure so that the lure travels at a selected depth corresponding to the depth at which the school of fish is located. This substantially increases the effectiveness of the cast and retrieval.

The particular form of the sinker also is useful in bottom fishing. When bottom fishing from a boat, the conventional weight normally maintained the lure on the bottom of the body of water. However, if the boat drifts, the travel of the boat tends to elevate the weight and raise the lure from the bottom. With a sinker of the present invention, if the boat drifts, the travel of the sinker through the water does not tend to elevate the sinker, but rather, maintains the sinker close to the bottom and thereby insures retention of the lure adjacent the bottom.

Since the point of attachment may be selected among three distances, the single sinker illustrated in the drawing permits the fisherman to select the depth of travel of the sinker through the water from among three levels, thereby effectively replacing three separate sinkers, and conserving otherwise cluttered space of the tackle box for other uses. Although the illustrated weight is designed for a specific use, the principle embodied therein is applicable to sinkers having other weights and sizes.

It is not intended to limit this disclosure to a particular size and shape, but changes and modifications may be made therein and thereto within the scope of the following claims.

I claim:

1. A sinker for attachment to a fishing line adjacent the lure for determining the depth of the lure comprising an elongated weighted body which is generally tear-drop shape in plan and having a rounded bottom surface and a substantially flat top surface which constitutes a planing surface, said body having an enlarged forward portion with the center of gravity of the sinker located therein and a tapering tail portion extending rearwardly beyond the center of gravity, a lug projecting upwardly from said upper surface and being elongated along the longitudinal center plane of said sinker, means in said lug providing for attachment of said fishing line to said sinker at different selected distances rearwardly of the center of gravity of said sinker whereby the pitch attitude of said sinker when at rest positions said upper planing surface inclined rearwardly and upwardly relative to the horizontal, and means projecting from the rounded bottom surface of said sinker affording attachment of the lure to said sinker whereby when said sinker is pulled through the water the inclined pitch of the upper surface causes the sinker to seek a predetermined depth in the water.

2. A sinker according to claim 1 wherein the forward portion of said sinker is bulbous and is rounded on the under surface and the rearward tail portion of said sinker is rounded but of generally triangular cross section to provide a keel-like effect for assisting free passage of the sinker through the water.

3. A sinker according to claim 1 wherein said lug extending from the upper surface and said fastening means extending from the lower surface comprise the upper and lower end portions of a plate member imbedded in said sinker body and disposed along the longitudinal center plane of said body rearwardly of the center of gravity thereof.

4. A sinker according to claim 3 wherein said fishing-line attachment means of said lug comprises a series of hole disposed along the upper edge of said upwardly projecting lug member.

5. A sinker according to claim 1 wherein said upper planing surface is perpendicular to the longitudinal center plane of said sinker.

* * * * *